(12) United States Patent
Nicoud et al.

(10) Patent No.: US 6,471,870 B2
(45) Date of Patent: *Oct. 29, 2002

(54) METHOD INTENDED TO OPTIMIZE THE OPERATION OF A SYSTEM FOR SEPARATING THE CONSTITUENTS OF A MIXTURE

(75) Inventors: Roger-Marc Nicoud, Verlaine (FR); Michel Bailly, Joffre (FR)

(73) Assignees: Novasep, Vandoeuvre les Nancy (FR); Institut Francais du Petrole, Rueil-Malmaison Cedex (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/097,590

(22) Filed: Jun. 16, 1998

(65) Prior Publication Data

US 2002/0014458 A1 Feb. 7, 2002

(30) Foreign Application Priority Data

Jun. 19, 1997 (FR) .............................. 97 07756

(51) Int. Cl.⁷ .............................................. B01D 15/08
(52) U.S. Cl. ...................................... 210/659; 210/662
(58) Field of Search ................................. 210/659, 662, 210/96.1, 143

(56) References Cited

U.S. PATENT DOCUMENTS

| 4,182,633 A |   | 1/1980 | Ishikawa et al. | 127/46 |
|---|---|---|---|---|
| 5,102,553 A | * | 4/1992 | Kearney et al. | 210/659 |
| 5,457,260 A |   | 10/1995 | Holt | 585/820 |
| 5,470,482 A | * | 11/1995 | Holt | 210/662 |
| 5,902,486 A | * | 5/1999 | Couenne et al. | 210/659 |

FOREIGN PATENT DOCUMENTS

WO         9108815        6/1991

OTHER PUBLICATIONS

*Journal of Chromatography*, vol. 658, No. 2, Jan. 14, 1994, pp. 271–282, article by Shuji Adachi, entitled "Simulated moving–bed chromatography for continuous separation of two components and its application to bioreactors".

*Journal of Chromatography*, vol. 1, No. 769, May 2, 1997, pp. 25–35, article by L. S. Pais et al, entitled "Modeling, simulation and operation of a simulated moving bed for continuous chromatographic separation of 1,1'–bi–2–napthol enantiomers".

*Journal of Chromatography*, vol. 1, No. 769, May 2, 1997, pp. 3–24, article by Marco Mazzotti et al, entitled "Optimal operation of simulted moving bed units for nonlinear chromatographic separations".

*Journal of Chromatography*, vol. 1, No. 769, May 2, 1997, pp. 81–92, article by J. Strube et al, entitled "Dynamic simulation of simulated moving–bed chromatographic processes for the optimization of chrial separations".

* cited by examiner

*Primary Examiner*—Ivars Cintins
(74) *Attorney, Agent, or Firm*—Antonelli, Terry, Stout & Kraus, LLP

(57) ABSTRACT

A method for optimizing the operation of a simulated moving bed (LMS) type (closed or open) separation loop consisting of the interconnection in series of beds containing an adsorbent solid phase, divided into several zones, four for example, delimited by fluid injection and draw-off points (F, El, Ex, R). The optimization sought is obtained by selecting initial values to be imposed on operating variables (internal liquid and solid flows, permutation period, etc.) of a simulated moving bed (LMS) from internal flow rates of a true moving bed (LMV), knowing the flow rate of the feedstock (F) injected in the loop and the concentrations of the various constituents of this feedstock. The invention has an application for optimizing aromatic hydrocarbon or optical isomer separation loops.

11 Claims, 3 Drawing Sheets

METHOD INTENDED TO OPTIMIZE THE OPERATION OF A SYSTEM FOR SEPARATING THE CONSTITUENTS OF A MIXTURE

BACKGROUND OF THE INVENTION

1. Field of the Invention

The present invention relates to a method for optimizing the operation of a simulated moving bed system for separating constituents.

The present invention more specifically relates to a method for determining directly an optimum initialization point very close to the working point to be reached in a simulated moving bed process for separating constituents.

The method notably applies to the separation of aromatic hydrocarbons or optical isomers.

2. Description of the Prior Art

In industry, there are many continuous separation processes based on selective adsorption of at least one component among several in a mixture of fluids, notably processes known as simulated countercurrent chromatography processes where the property of certain porous solids, in the presence of liquid, gaseous or supercritical mixtures, of retaining more or less significantly the various constituents of the mixture is used.

Separation or fractionation processes based on chromatography are most often implemented in a device comprising a set of n chromatographic columns or column fractions interconnected in series (generally $4 \leq n \leq 24$), forming an open or closed loop. A porous solid of determined grain size, distributed in different beds, constitutes the stationary phase.

Injection points for the mixture to be separated, comprising at least two constituents and the solvent or desorbent, and fluid extraction points are distributed along this loop and delimit most often four zones I, II, III, IV, the constituent preferentially sought being mainly either in the extract (Ex) or in the raffinate (R). Identical liquid flows run through all the columns or column fractions of a zone.

The raffinate flow rate is equal to the sum of the inlet flow rates minus the extract flow rate. In addition to these controlled flow rates is a recycle flow rate.

In a process known as true moving bed (LMV) process, a stationary concentration profile develops in the separation loop where the position of the points of injection of a feedstock F, of an eluent El, and of draw-off of an extract Ex and of a raffinate R remains fixed. The adsorbent solid and the liquid circulate in a countercurrent flow. A solid carrying system and a recycling pump P, both placed in the loop (at the junction of zones I and IV where the only species present in the liquid as well as in the solid is the elution carrier fluid), allow respectively to drive the solid from the bottom to the top and conversely the liquid from the top to the bottom.

Processes known as simulated moving bed (LMS) processes avoid a major difficulty inherent in true moving bed processes, which consists in correctly circulating the solid phase without creating attrition and without considerably increasing the bed porosity in relation to that of a fixed bed. In order to simulate the displacement thereof, the solid is placed in a certain number n of fixed beds placed in series and it is the concentration profile which is displaced at a substantially uniform speed all around an open or closed loop by shifting the injection and draw-off points.

In practice, successive shifting of the injection and draw-off points is performed by means of a rotary valve or more simply by means of a set of properly controlled on-off valves. This circular shift, performed at each period, of the various incoming-outgoing liquid flows in a given direction amounts to simulating a displacement of the solid adsorbent in the opposite direction.

The main inlet flow rates are the feedstock flow rate and the eluent flow rate. The outlet flow rates are the extract flow rate and the raffinate flow rate. At least one of these flows (raffinate, eluent, extract) is withdrawn or injected under pressure control. The raffinate flow rate is equal to the sum of the inlet flow rates minus the extract flow rate. In addition to these controlled flow rates there is a controlled recycle flow rate. The relative location of each of the four flows around the beds thus defines four distinct zones in the case of the process shown in FIG. 5.

Countercurrent or cocurrent simulated moving bed chromatography processes are for example described in U.S. Pat. Nos. 2,985,589 and 4,402,832.

U.S. Pat. Nos. 5,457,260 and 5,470,482 describe a process controlling a simulated moving bed system for separating a mixture of constituents, comprising two loop interconnected multiple-bed columns, where at least one characteristic such as the purity of a constituent or the yield thereof or a combination of both is controlled.

Determining the parameters necessary to the operation of a separation loop is difficult because many variables are involved in the process. For a given stationary phase and eluent, a composition of mixture to be purified and fixed constituents to be drawn off, the following values have to be calculated:

four liquid flow rates and a permutation period,
the concentration of the mixture to be separated,
the number of columns and the number of columns per zone,
the length and the diameter of the columns.

Charton F. and Nicoud R. M. (1995), in Journal of Chromatography, A 702, 97, 1995, also describe a method for calculating various characteristics of separation systems.

For a given supply concentration, these flow rates can be obtained empirically but the optimum solution lies in a limited zone of a five dimensional space (4 liquid flows and either the flow of solid in the case of a true moving bed, or the permutation period T in the case of a simulated moving bed), which can be reached most often only after a considerable time without being certain that the optimum point has been reached.

In order to find the optimum conditions for controlling or dimensioning a true (LMV) or simulated (LMS) moving bed separation system, it is preferable to find a model representative of the separation process taking account of adsorption phenomena, mass transfer and of the properties of the fluid flow through the porous solid phase, and to replace a burdensom empirical approach by simulations. This approach by simulation can however be just as burdensome if it is not properly performed. In order to implement it advantageously and to reduce the number of trial-and-error cycles necessary to stabilize operation, it is preferable to start from a well-targeted initial point.

Determining the adsorption isotherms describing the adsorption of the components to be separated is an essential stage for formation of the model. For a single-constituent system, the relation between the concentrations in the adsorbed phase $\overline{C}$ and in the liquid phase C is sought, at equilibrium and at a given temperature. Even though this relation can be linear in a wide concentration range, it is generally non linear. For a multi-constituent system, a competition for access to the adsorption sites, which are in limited number, adds to the non linearity of the equilibrium isotherm. The adsorbed phase concentration $\overline{C}$ of a compound i then depends on all the concentrations Ci in the liquid phase. A relation of the form: $\overline{C}_i = f_i(C1, C2, \text{etc})$ is therefore sought for each constituent.

Various initialization possibilities for the variables involved in the separation units are proposed in the literature according to the type of adsorption isotherms generated. According to well-known examples, these are linear isotherms or Langmuir type competitive isotherms. However, none of the known instances provides a satisfactory solution. The most realistic ones are the Langmuir competitive isotherms but they give selectivites independent of the composition whereas in practice it is observed that selectivity evolves with the concentration. It is therefore advisable to use isotherms describing more realistic adsorption effects for initialization of true moving bed (LMV) as well as of simulated moving bed (LMS) type separation units.

SUMMARY OF THE INVENTION

The method according to the invention allows, considering the separation results sought (flow rates, concentrations, purities, any isotherms), to direct determination of an initial working point very close to an optimum working point of a simulated moving bed (LMS) system for separating the constituents of a mixture containing an adsorbent solid phase, comprising a (closed or open) loop including several zones delimited by fluid injection and extraction points, by selecting initial values to be imposed on the fluid flow rates, knowing the flow rate of the feedstock injected in the loop and the concentrations of the various constituents of this feedstock, from flow rates corresponding to an equivalent true moving bed (LMV) loop.

The method comprises:

determining the flow rates of an equivalent loop by:
 a) using a thermodynamic adsorption model that is not limited to a particular shape of adsorption isotherms,
 b) locating, along the equivalent loop, compressive or dispersive fronts in concentrations of the various constituents,
 c) determining propagation velocity of the fronts in reference to material balances, and
 d) equating the propagation velocity of key compositions to zero at particular points of the loop, and
 e) determining the corresponding flow rates of the simulated moving bed loop.

According to an embodiment applied to the separation of a mixture comprising at least two constituents A, B, where the solid phase adsorbs constituent B more than constituent A, in a loop comprising at least three zones, a zone I, a zone II and a zone III, with a liquid injection point at the inlet of zone I, an extract draw-off point between zone I and zone III, and a raffinate draw-off point at the outlet of zone III, concentrations of the feedstock and adsorption isotherms being known, a working point of the equivalent loop is determined by carrying out the following stages:

1) the flow rate in zone I is determined by equating the propagation velocity of constituent B to zero,
2) the flow rate in zone II and the concentration of constituent B in the extract are determined from an estimation of the concentration of constituent B in zone II and from the solution of the characteristic equation,
3) the respective concentrations of constituents A and B in zone III are determined by means of an iterative procedure including:
 a) initializing the respective concentrations,
 b) determining a flow rate in zone III related to the propagation velocity of compressive fronts, and
 c) checking a material balance for constituent B;
4) the respective concentrations of constituents A and B are varied at the inlet of zone III while keeping the same characteristic in order to satisfy the global material balance for constituent B,
5) the concentration of constituent A in zone III is determined, and
6) the previous stages are repeated until the material balance of constituent A is checked.

According to another embodiment variant applied to a loop comprising four zones including a zone I, a zone II, a zone III and a zone IV, with a fluid injection point between zone IV and zone I, an extract draw-off point between zone I and zone II, an injection point for a feedstock including the mixture between zone II and zone III, and a raffinate draw-off point between zone III and zone IV, the concentrations of the feedstock and the adsorption isotherms being also known, the working point of the equivalent loop is determined by carrying out stages 1) to 6), with stage 5) additionally comprising determining a flow rate in zone IV, related to the propagation velocity of the compressive fronts.

Determining the initial working point is mainly obtained by equating the displacement velocity of the constituents to zero in order to obtain, as the case may be, a pure constituent in the extract or a pure constituent in the raffinate, or to obtain a defined intermediate purity in the extract or in the raffinate.

According to an embodiment, the equivalent loop control rates are determined by using favorable type isotherms (for example type I isotherms from the well-known Brunauer classification).

According to another embodiment, an inverse algorithm is applied for locating the compressive and dispersive fronts, with an unfavorable isotherm (of type III for example in the same classification).

BRIEF DESCRIPTION OF THE DRAWINGS

Other features and advantages of the method according to the invention will be clear from reading the description hereafter, with reference to the accompanying drawings wherein.

Figure 1:
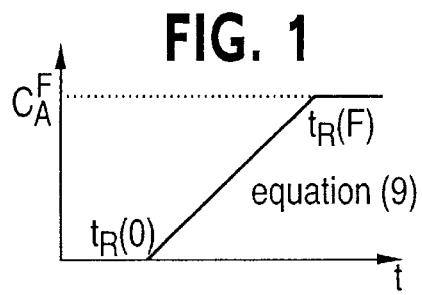
FIG. 1 shows a curve of variation as a function of time of the concentration $C_A^F$ of an adsorbed phase (dispersive front)

In order to facilitate the description and the implementation of the method described hereafter, notions well-known to specialists, relative to the modelling of separation loops which are used to implement the specific method according to the invention, will first be described in the situation where the eluent used is practically not adsorbed.

I Fixed Bed Single-constituent or Binary Separation Systems

An adsorption isotherm is a function relating $C_A$ to $\overline{C}_A$ at constant temperature and pressure when equilibrium is reached:

$$\overline{C}_A = f_A(C_A) \quad (1).$$

It is well-known that the initial slope of isotherm $\overline{K}_A$ plays an important part:

$$\overline{K}_A = \lim_{C_A \to 0} \frac{df_A(C_A)}{dC_A} = f_A'(0) \quad (2)$$

An ideal column without hydrodynamic dispersion or mass transfer limitation is considered hereafter. In such a system, the material balance leads to the equation as follows:

$$u \cdot \frac{\partial C_A}{\partial z} + \varepsilon_e \cdot \frac{\partial C_A}{\partial t} + (1-\varepsilon_e) \cdot \frac{\partial \overline{C}_A}{\partial t} = 0 \quad \text{(no dispersion term)} \quad (3)$$

where u is the global velocity of the liquid and $\varepsilon_e$ the external porosity of the bed. For constant boundary conditions and uniform initial conditions, this type of equation is known for translating "Rieman's problem" for which the solution depends on a single parameter σ which has the dimension of a velocity:

$$\sigma = z/t \quad (4),$$

where z is the abscissa along the axis of the column.

Eq. (3) has two types of root:
the concentration is constant, then $$\frac{dC_A}{d\sigma} = 0$$

(a plateau is reached)
the concentration varies, a front forms. A given concentration moves at a certain velocity σ such that:

$$\sigma = \frac{u}{\varepsilon_e + (1-\varepsilon_e) \cdot f'(C_A)} \quad (5)$$

According to whether the concentration increases or decreases, the front is referred to as compressive or dispersive.

Knowing the adsorption isotherm derivative, relation (5) allows calculation of the propagation velocity of each constituent. A given concentration appears at the outlet of the column at the time $$t_R(C_A) = \frac{L}{\sigma} = \frac{L}{u} \cdot (\varepsilon_e + (1-\varepsilon_e) \cdot f'(C_A)),$$

L being the length of the column.

A separation loop is considered in an empty initial state (containing no feedstock), that is supplied with a feedstock F of constant concentration $C_A^F$. At the outlet the concentration will increase from 0 and eventually reach $C_A^F$.

Two different situations can be distinguished:

1) $f'(C_A)$ increases when $C_A$ increases: unfavorable isotherm.

$$t_R(0) = t_0 \cdot \left(1 + \frac{1-\varepsilon_e}{\varepsilon_e} \cdot f'(0)\right) \text{ and } t_R(C_A^F) = t_0 \cdot \left(1 + \frac{1-\varepsilon_e}{\varepsilon_e} \cdot f'(C_A^F)\right)$$

can be calculated.

For any concentration between 0 and the concentration of feedstock F, we have: $t_R(0) < t_R(C_A) < t_R(C_A^F)$, and the curve of transition of the concentration as a function of time is given in FIG. 1.

A dispersive front which is imposed by the thermodynamics and not by any hydrodynamic dispersion or mass transfer limitation is obtained. The front shown in FIG. 1 is the front that would be obtained with a column of infinite efficiency. With a real column, the front would not be smaller but only more dispersed.

2) $f'(C_A)$ decreases when $C_A$ increases: favorable isotherm of type I in Brunauer's classification.

Figure 2:
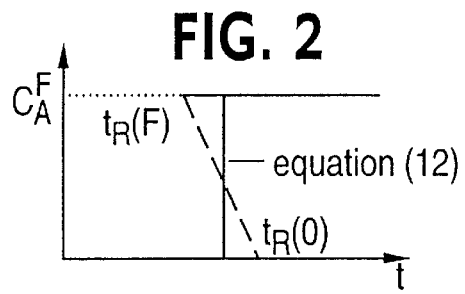
FIG. 2 shows, as a function of time, a variation curve of a concentration $C_A^F$ in a desorption phase exhibiting a discontinuity because of a shock (compressive front)
Figure 3A:
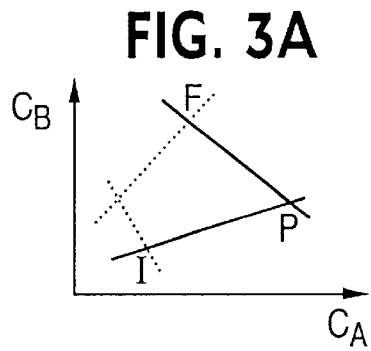
FIGS. 3a to 3d show, for Langmuir type isotherms, the construction of hodographs $(C_A, C_B)$ and of chromatograms $C(t)$, FIG. 4 diagrammatically illustrates a countercurrent separation process, FIG. 5 diagrammatically illustrates a countercurrent binary separation loop.
Figure 3B:
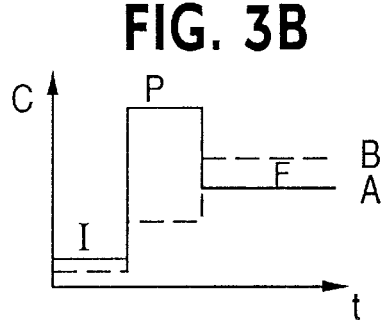
Figure 3C:
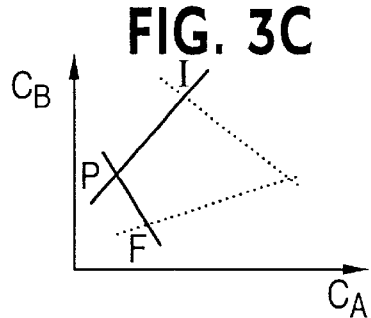
Figure 3D:
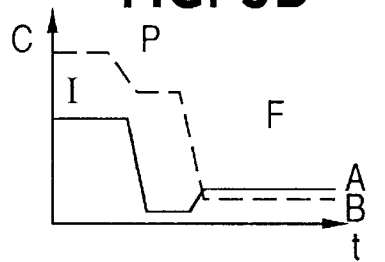

In this case, it is calculated as follows:

$$t_R(0) > t_R(C_A) > t_R(C_A^F)$$

and we obtain an entirely unrealistic situation is obtained (FIG. 2). This unacceptable result is due to the appearance of shocks and as a result the solutions cannot be derived. In fact, all the concentrations move at the same velocity. A shock occurs at a time that is simply determined by means of a global material balance.

$$t_{R,shock} = t_0 \left[1 + \frac{1-\varepsilon_e \overline{C}_A^F}{\varepsilon_e C_A^F}\right] \text{ and } \sigma_{shock} = \frac{u}{1 + \frac{1-\varepsilon_e \overline{C}_A^F}{\varepsilon_e C_A^F}} \quad (6)$$

$\overline{C}_A^F$: concentration in equilibrium with $C_A^F$.

If the opposite case is considered of a regeneration where the column is initially in equilibrium with a concentration $C_A^I$ and regenerated with a solution free from species A, a compressive front is obtained in situation 1 and a dispersive front is obtained in situation 2.

If the solution comprises two solutes A, B, two adsorption isotherms have to be defined:

$$\overline{C}_A = f_A(C_A, C_B)$$

$$\overline{C}_B = f_B(C_A, C_B) \text{ T=const.} \quad (7)$$

with initial slopes the knowledge of which is important:

$$\overline{K}_A = \left.\frac{\partial f_A}{\partial C_A}\right|_{C_A = C_B = 0} \quad (8)$$

$$\overline{K}_B = \left.\frac{\partial f_B}{\partial C_B}\right|_{C_A = C_B = 0}$$

If there is no hydrodynamic dispersion or mass transfer restriction, the material balance can be written as follows:

$$u \cdot \frac{\partial C_A}{\partial z} + \varepsilon_e \cdot \frac{\partial C_A}{\partial t} + (1-\varepsilon_e) \cdot \frac{\partial \overline{C}_A}{\partial t} = 0$$

$$u \cdot \frac{\partial C_B}{\partial z} + \varepsilon_e \cdot \frac{\partial C_B}{\partial t} + (1-\varepsilon_e) \cdot \frac{\partial \overline{C}_B}{\partial t} = 0$$

It can be shown that the equation only depends on $\sigma = z/t$ and that two types of situation are encountered: one, obvious, where:

$$\frac{dC_A}{d\sigma} = \frac{dC_B}{d\sigma} = 0$$

(the concentrations are constant), the other where the concentrations vary, and σ must satisfy the important characteristic equation as follows:

$$\left| \begin{array}{cc} u - \sigma \cdot \left(\varepsilon_e + (1-\varepsilon_e) \cdot \frac{\partial \overline{C}_A}{\partial C_A}\right) & -\sigma \cdot (1-\varepsilon_e) \cdot \frac{\partial \overline{C}_A}{\partial C_B} \\ -\sigma \cdot (1-\varepsilon_e) \cdot \frac{\partial \overline{C}_B}{\partial C_A} & u - \sigma \cdot \left(\varepsilon_e + (1-\varepsilon_e) \cdot \frac{\partial \overline{C}_B}{\partial C_B}\right) \end{array} \right| = 0 \quad (9)$$

It is an equation of the second order as a function of σ, with two roots $\sigma_+$ and $\sigma_-$ which give the propagation velocity of the fronts. If it is considered:

$$\sigma_+ = \frac{u}{\varepsilon_e + (1-\varepsilon_e) \cdot \theta_+} \quad \sigma_- = \frac{u}{\varepsilon_e + (1-\varepsilon_e) \cdot \theta_-} \quad (11)$$

$\theta_+$ and $\theta_-$ being the roots of the equation $$\theta^2 - \left(\frac{\partial \overline{C}_A}{\partial C_A} + \frac{\partial \overline{C}_B}{\partial C_B}\right) \cdot \theta + \left(\frac{\partial \overline{C}_A}{\partial C_A} \cdot \frac{\partial \overline{C}_B}{\partial C_B} - \frac{\partial \overline{C}_A}{\partial C_B} \cdot \frac{\partial \overline{C}_B}{\partial C_A}\right) = 0 \quad (12)$$

then θ only depends on the adsorption isotherm.

However, since $C_A$ and $C_B$ are functions of σ only, they are obviously related. The relation that connects them is obtained after substitution of the possible values of σ in one of the two equations of system (9), which leads to:

$$\frac{dC_B}{dC_A} = \frac{\theta_+ - \frac{\partial \overline{C}_A}{\partial C_A}}{\frac{\partial \overline{C}_A}{\partial C_B}} \text{ or } \frac{dC_B}{dC_A} = \frac{\theta_- - \frac{\partial \overline{C}_A}{\partial C_A}}{\frac{\partial \overline{C}_A}{\partial C_B}} \quad (13)$$

If the isotherms $\overline{C}_A(C_A,C_B)$ and $\overline{C}_B(C_A,C_B)$ are present, relation (13) is an algebraic equation as a function of $dC_B/dC_A$. Integration of the two roots $dC_B/dC_A$ allows the plotting of two paths in plane ($C_A,C_B$). This representation of a chromatogram for a binary system is referred to as a hodograph where the respective roles of, the independent variables (time and space) and of the dependent variables ($C_A,C_B$) are simply interchanged. In the schematic hodograph example of FIG. 3, letters I and F respectively denote the initial composition and the composition of the feedstock. There are two possible paths between I and F, the suitable path and the composition corresponding to the plateau (constant concentration) depending on the direction of evolution of the process (adsorption or desorption).

After determining the relation between concentrations $C_A$ and $C_B$, the chromatogram has to be positioned on the time axis. To that effect, the nature of each front has to be identified. According as σ decreases or increases along a path, the front is dispersive or compressive. In the latter case, Eq. (11) has to be replaced by:

$$u_R = \frac{u}{\varepsilon_e + (1-\varepsilon_e) \cdot \frac{\Delta \overline{C}}{\Delta C}} \quad (14)$$

applied to each constituent A or B. In this relation, Δ denotes the difference between the two states along the path (I–P or P–F).

II Countercurrent Single-constituent or Binary Separation Systems

Figure 4:
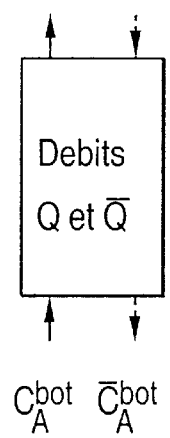
Figure 5:
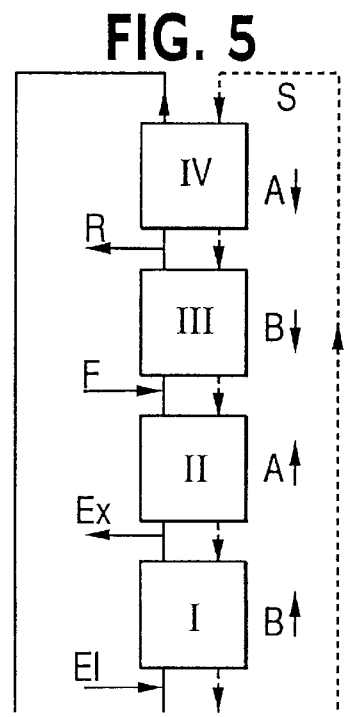

Before studying the case of a conventional 4-zone separation system, consideration the case of a system with a single zone (FIG. 4) through which a liquid phase and a solid phase pass is undertaken. The product concentration in the liquid phase that would be in equilibrium with the concentration in the solid phase is defined:

$$C_A^{top*} \text{concentration in equilibrium with } \overline{C}_A^{top} \quad (15)$$

Unlike fixed bed chromatography systems, countercurrent systems can work in a steady state. The equilibrium theory where the axial dispersion and the kinetic limitations are disregarded readily allows to deducing the main characteristics of a possible steady state. According to the equilibrium model, the material balance for a simple solute is written as follows:

$$Q \frac{\partial C_A}{\partial z} - \overline{Q} \cdot \frac{\partial \overline{C}_A}{\partial z} + \Omega \cdot \left[\varepsilon_e \frac{\partial C_A}{\partial t} + (1-\varepsilon_e) \frac{\partial \overline{C}_A}{\partial t}\right] = 0 \quad (16)$$

where Q denotes the liquid flow rate, $\overline{Q}$ the solid flow rate and Ω the section of the column. As previously mentioned in connection with fixed bed systems, it can be similarly shown that this equation only depends on parameter σ=z/t and that the problem has two possible solutions according as the concentration is uniform in the system $$\frac{dC_A}{d\sigma} = 0 \quad (17)$$

or varies with a front moving at a (positive or negative) velocity given by:

$$\sigma = \frac{u - \overline{u} \frac{\partial \overline{C}_A}{\partial C_A}}{\left(\varepsilon_e + (1-\varepsilon_e) \cdot \frac{\partial \overline{C}_A}{\partial C_A}\right)} \quad (18)$$

In the general case of non linear systems, the propagation velocity of the fronts is dependent on the concentration. According as σ is positive, negative or zero, the front moves towards the top of the column (FIG. 4), towards the bottom of the column or it can be stabilized:

σ>0 ascending front

σ<0 descending front

σ=0 stabilized front. (19)

As in a fixed bed chromatography system, compressive or dispersive fronts can be obtained according to the shape of the adsorption isotherm. If there is interested only in the state of equilibrium of the separation system, the boundary conditions that will impose the internal profile and not the initial concentration profile have to be considered. In cases where the slope of the adsorption isotherms exhibits monotonic variations, it can be established, by analogy with the derived theory for fixed beds, that the fronts will be compressive or dispersive according to the variation of the propagation velocity with the concentration.

The case of compressive fronts is considered first. As it is the case with fixed beds, using the expression that gives the propagation velocity of the front leads to an unrealistic behavior caused by the appearance of discontinuous fronts in the system, which prevents continuous formulation of the local material balance. In such a case, the propagation velocity of the compressive fronts finds the following expression:

$$\sigma = \frac{u - \bar{u}\frac{\Delta \overline{C}_A}{\Delta C_A}}{\left(\varepsilon_e + (1-\varepsilon_e) \cdot \frac{\Delta \overline{C}_A}{\Delta C_A}\right)} \text{ for compressive fronts} \quad (20)$$

where $\Delta$ denotes the difference between the concentrations at the top and at the bottom of the column.

The case of a dispersive behavior is more complex because the propagation velocity depends on the concentration according to Eq. (19) and a zero propagation velocity can correspond to a given concentration. If we consider the case of a front whose velocity is zero, then, according to relation (19), the concentration must satisfy the relation:

$$u - \bar{u} \cdot \frac{\partial \overline{C}_A}{\partial C_A} \text{ for } C_A = C_A^{stab} \quad (21)$$

where $C_A^{stab}$ is the concentration leading to a zero velocity.

For a given set of velocities of the liquid and of the solid, the root may or may not exist and it may or may not range between $C_A^{bot}$ and $C_A^{top*}$, which are the concentrations at the bottom and at the top of the column respectively. If we suppose that the adsorption isotherm preferably follows a type I law, which amounts to saying that its slope decreases when the concentration increases, the possible solutions to the problem can be classified as follows:

either root $C_A^{stab}$ does not exist or does not range between $C_A^{bot}$ and $C_A^{top*}$: whatever the concentration, the fronts then move in the same direction denoted by the sign of the propagation velocity, or root $C_A^{stab}$ exists and it ranges between $C_A^{bot}$ and $C_A^{top*}$: the concentrations above $C_A^{stab}$ then move upwards and the concentrations below $C_A^{stab}$ move downwards. The system contains a liquid of concentration $C_A^{stab}$.

A similar theoretical pattern can be used for modelling the situation of binary mixtures. For each constituent or species, the material balance can be written as follows:

$$Q\frac{\partial C_A}{\partial z} - \overline{Q} \cdot \frac{\partial \overline{C}_A}{\partial z} + \Omega \cdot \left[\varepsilon_e \frac{\partial C_A}{\partial t} + (1-\varepsilon_e)\frac{\partial \overline{C}_A}{\partial t}\right] = 0 \quad (22)$$

$$Q\frac{\partial C_B}{\partial z} - \overline{Q} \cdot \frac{\partial \overline{C}_B}{\partial z} + \Omega \cdot \left[\varepsilon_e \frac{\partial C_B}{\partial t} + (1-\varepsilon_e)\frac{\partial \overline{C}_B}{\partial t}\right] = 0$$

as for single-component systems, it can be shown that these equations only depend on parameter $\sigma = z/t$ and accept two types of solution: either the concentrations are constant or they vary with the velocity $\sigma = z/t$ which is the root of As we have seen above, in connection with characteristic equation 9, it is obtained as follows:

$$\sigma_+ = \frac{u - \bar{u} \cdot \theta_+}{\varepsilon_e + (1-\varepsilon_e) \cdot \theta_+} \quad \sigma_- = \frac{u - \bar{u} \cdot \theta_-}{\varepsilon_e + (1-\varepsilon_e) \cdot \theta_-} \quad (24)$$

$\theta_+$ and $\theta_-$ being the roots of:

$$\theta^2 - \left(\frac{\partial \overline{C}_A}{\partial C_A} + \frac{\partial \overline{C}_B}{\partial C_B}\right) \cdot \theta + \left(\frac{\partial \overline{C}_A}{\partial C_A} \cdot \frac{\partial \overline{C}_B}{\partial C_B} - \frac{\partial \overline{C}_A}{\partial C_B} \cdot \frac{\partial \overline{C}_B}{\partial C_A}\right) = 0 \quad (25)$$

According to the sign of these roots, the fronts can move towards the top of the column or downwards, or stabilize. Roots $\theta$ are often presented as global derivatives (denoted by D):

$$\theta = \frac{D\overline{C}_A}{DC_A} = \frac{\partial \overline{C}_A}{\partial C_A} + \frac{\partial \overline{C}_A}{\partial C_B} \cdot \frac{dC_B}{dC_A}\left(= \frac{D\overline{C}_B}{DC_B} = \frac{\partial \overline{C}_B}{\partial C_B} + \frac{\partial \overline{C}_B}{\partial C_A} \cdot \frac{dC_A}{dC_B}\right)$$

After considering in sections I and II above, in order to facilitate comprehension, well-known equations which model the behavior of single-constituent or binary systems, either fixed bed or countercurrent systems, the method according to the invention applied by way of non limitative example to a 4-zone separation system is described hereafter.

III 4-zone Separation System

In the present case, the feedstock to be separated comprises two constituents A and B. If constituent B is more readily retained by the solid phase, A can be expected at the Raffinate outlet and B at the Extract outlet. In order to obtain this type of behavior, specific constraints have to be imposed in the various zones.

Zone I: constituents A and B must move upwards (towards zone II) so as to prevent them from being recycled with the solid phase of zone I to zone IV. Since B is retained more readily than A by the solid phase, this constraint is more difficult to satisfy for B. Consequently, the liquid flow in zone I must be sufficient to force the concentration front of constituent B to ascend;

Zone II: constituent A has to be displaced towards zone III so that constituent B can be recovered pure therein;

Zone III: constituent B has to be displaced towards zone II in order to recover constituent A pure therein;

Zone IV: the liquid flow rate must be low enough to force constituents A and B to descend (towards zone III) so as to prevent them from being recycled from zone IV to zone I with the liquid phase. It can be noted that if this constraint is satisfied for A, it will also be for B.

At this stage, the problem consists in calculating the flow rates that will allow these objectives to be reached. As discussed above, according to the equilibrium model, the internal concentration profiles in a zone are always flat, $$\begin{vmatrix} u - \bar{u}\frac{\partial \overline{C}_A}{\partial C_A} - \sigma\left(\varepsilon_e + (1-\varepsilon_e) \cdot \frac{\partial \overline{C}_A}{\partial C_A}\right) & \bar{u}\frac{\partial \overline{C}_A}{\partial C_B} - \sigma \cdot (1-\varepsilon_e) \cdot \frac{\partial \overline{C}_A}{\partial C_B} \\ \bar{u} \cdot \frac{\partial \overline{C}_B}{\partial C_A} - \sigma \cdot (1-\varepsilon_e) \cdot \frac{\partial \overline{C}_B}{\partial C_A} & u - \bar{u}\frac{\partial \overline{C}_B}{\partial C_B} - \sigma \cdot \left(\varepsilon_e + (1-\varepsilon_e) \cdot \frac{\partial \overline{C}_B}{\partial C_B}\right) \end{vmatrix} = 0 \quad (23)$$

whether the front is compressive or dispersive. Consequently, according to this model, each species will be characterized by a single liquid concentration per zone.

The concentrations of constituents A and B in the various zones will be denoted by: $C_A^{ZI}, C_A^{ZII}, C_A^{ZIII}, C_A^{ZIV}$ and $C_B^{ZI}, C_B^{ZII}, C_B^{ZIII}, C_B^{ZIV}$.

Figure 6:
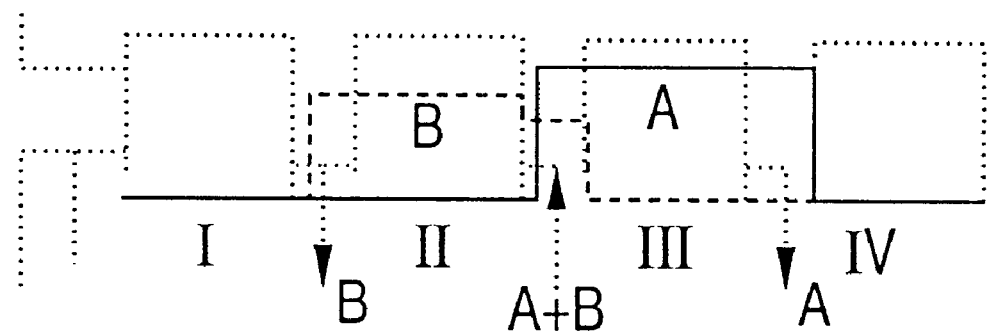
FIG. 6 shows the inner profile of the concentrations of two constituents A and B to be obtained in a loop comprising 4 zones I–IV.

In order to separate A and B, we impose:

$$C_A^{ZI}=0 \quad C_A^{ZII}=0 \quad C_A^{ZIV}=0$$

$$C_B^{ZI}=0 \quad C_B^{ZIII}=0 \quad C_B^{ZIV}=0 \tag{26}$$

and the internal concentration profiles must exhibit the pattern shown in FIG. 6.

In the case of favorable adsorption isotherms, the fronts are dispersive in zones I and II (desorption) and compressive in zones III and IV (adsorption), and the propagation velocities are given by Eqs. (20) or (24). Consequently, ($C_A^{zIIIe}$, $C_B^{zIIIe}$) is defined as the concentrations in the liquid flowing into zone III, the constraints to be satisfied in the various zones being expressed as follows:

zone I: B is pushed upwards for composition (0,0), so:

$$\left(\frac{u_I}{u} = \frac{Q_I}{Q} \geq \frac{D\overline{C}_B}{DC_B}\right)\bigg|_{C_A=0, C_B=0}$$

zone II: A is pushed upwards for composition $(0, C_B^{zII})$, so:

$$\left(\frac{u_{II}}{u} = \frac{Q_{II}}{Q} \geq \frac{D\overline{C}_A}{DC_A}\right)\bigg|_{C_A=0, C_B=C_B^{zII}}$$

zone III: B is pushed downwards for composition ($C_A^{zIIIe}$, $C_B^{zIIIe}$), so:

$$\frac{u_{III}}{u} = \frac{Q_{III}}{Q} \leq \frac{\overline{C}_B^{zIIIe} - 0}{C_B^{zIIIe} - 0}$$

zone IV: A is pushed downwards for composition ($C_A^{zIII}$, 0), so:

$$\frac{u_{IV}}{u} = \frac{Q_{IV}}{Q} \leq \frac{\overline{C}_A^{zIII} - 0}{C_A^{zIII} - 0} \tag{27}$$

System (27) is a general system allowing determination of the flow rates leading to complete separation of constituents A and B (favorable adsorption isotherms).

IV General Method of Determining the Optimum Initial Point: Quantitative Solution for Binary Separations We have seen that, the fundamental system to be solved, in order to estimate the flow rates leading to a binary separation, is system (27) with the inequalities being just satisfied, and the following system therefore has to be checked:

$$\left(\frac{Q_I}{Q} = \frac{D\overline{C}_B}{DC_B}\right)\bigg|_{C_A=0,C_B=0} \quad A \quad \left(\frac{Q_{II}}{Q} = \frac{D\overline{C}_A}{DC_A}\right)\bigg|_{C_A=0,C_B=C_B^{zII}} \tag{28}$$

-continued $$\frac{Q_{III}}{Q} = \frac{\overline{C}_B^{zIIIe} - 0}{C_B^{zIIIe} - 0} \quad \frac{Q_{IV}}{Q} = \frac{\overline{C}_A^{zIII}}{C_A^{zIII} - 0}$$

The estimation of $Q_I$ is obvious, and it may be considered that $$\left(\theta = \frac{D\overline{C}_A}{DC_A}\right)\bigg|_{C_A=0, C_B=C_B^{zII}}$$

is a root of the characteristic equation in zone II:

$$\theta^2 - \left(\frac{\partial \overline{C}_A}{\partial C_A} + \frac{\partial \overline{C}_B}{\partial C_B}\right)_{0,C_B^{zII}} \cdot \theta + \left(\frac{\partial \overline{C}_A}{\partial C_A} \cdot \frac{\partial \overline{C}_B}{\partial C_B} - \frac{\partial \overline{C}_A}{\partial C_B} \cdot \frac{\partial \overline{C}_B}{\partial C_A}\right)_{0,C_B^{zII}} = 0 \tag{29}$$

Considering Eq. (29), it appears that the problem is completely solved providing that concentrations $C_A^{zIII}$, $C_A^{zIIIe}, C_B^{zIIIe}, C_B^{zII}, \overline{C}_A^{zIII}, \overline{C}_B^{zIIIe}$ are known.

Material balances have been written to derive system (28) (model in equilibrium). Other global material balances also have to be considered:

$$C_A^F \cdot Q_F = C_A^{Raf} \cdot Q_{Raf}$$

and $$C_B^F \cdot Q_F = C_B^{Ext} \cdot Q_{Ext}$$

which can also be written as follows:

$$C_A^F \cdot (Q_{III} - Q_{II}) = C_A^{Raf} \cdot (Q_{III} - Q_{IV})$$

$$C_B^F \cdot (Q_{III} - Q_{II}) = C_B^{Ext} \cdot (Q_I - Q_{II}) \tag{30}$$

by denoting by $C_A^F, C_B^F, Q_F, C_A^{Raf}$ and $C_B^{Ext}$ respectively the concentration of A and B in the feedstock F, the feedstock flow rate, the concentration of A in the raffinate and the concentration of B in the extract.

Furthermore, for constituent B, the composition of the extract and the composition of the plate in zone II can be related to each other by writing a mass conservation relation for zones I and II:

$$Q \cdot \overline{C}_B^{zII} = Q_{II} \cdot C_B^{zII} + (Q_I - Q_{II}) \cdot C_B^{Ext} \tag{31}$$

The various compositions are also related because they must satisfy the characteristic equation or the coherence equation. The displacement velocities $U_{\Delta C1}$ and $U_{\Delta C2}$ of the concentrations are equal.

The coherence equation in zone III for example is written as follows:

$$U_{\Delta C1} = \frac{\overline{C}_B^{IIIs} - 0}{C_B^{IIIe} - 0} = \frac{\overline{C}_A^{III} - \overline{C}_A^{IIIs}}{C_A^{III} - \overline{C}_A^{IIIe}} = U_{\Delta C2} \tag{32}$$

Figure 7:
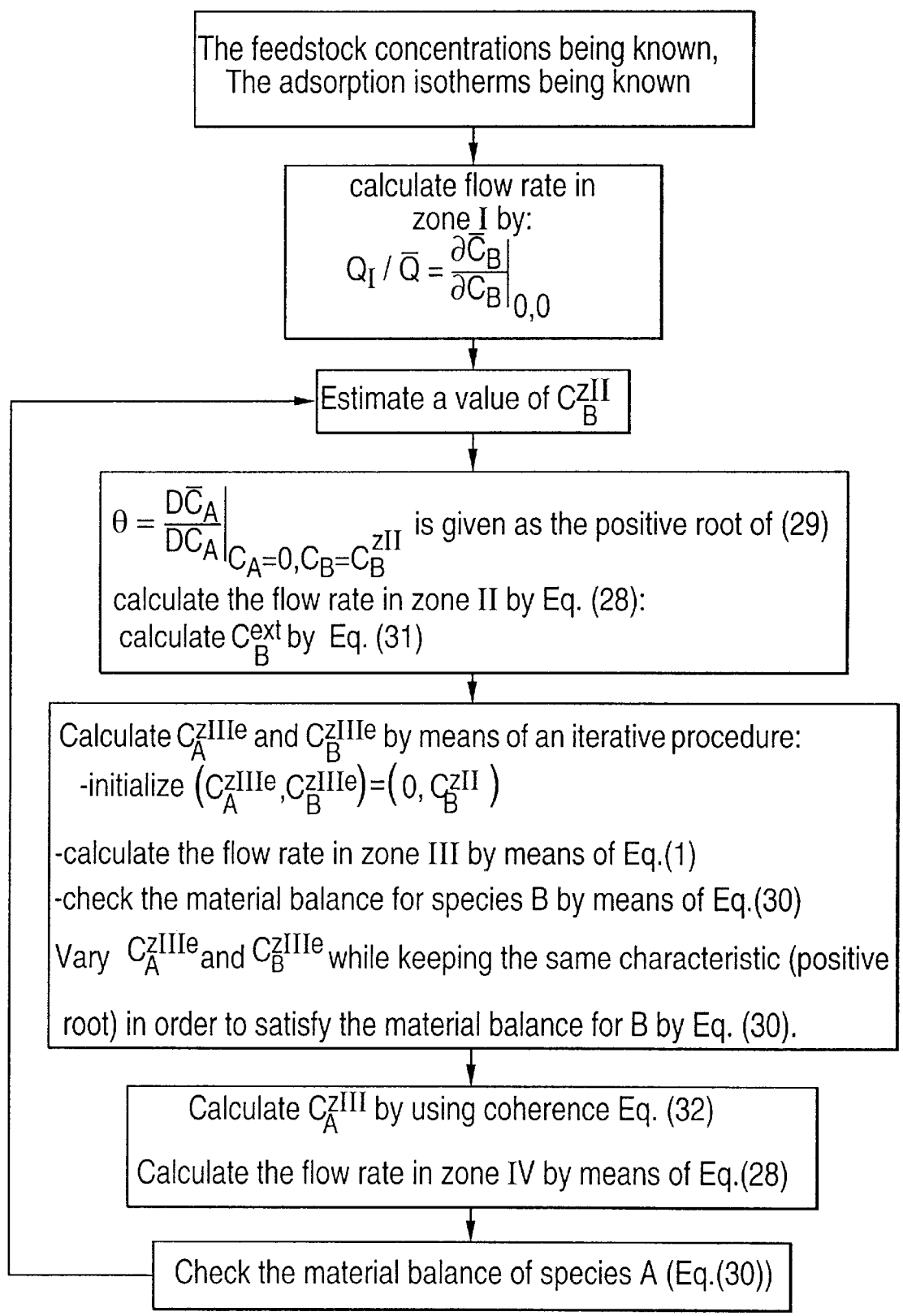
FIG. 7 shows a flowchart for selecting an optimum initial point.

The various stages allowing selection of the optimum initial set point according to the invention are set forth in the flowchart of FIG. 7.

Having thus determined the operating parameters of the true moving bed (LMV) equivalent loop, the corresponding parameters of the initialization point of the simulated moving bed (LMS) real loop are then determined, an operation which is well-known and which requires no particular explanation.

EXAMPLES

The two examples hereafter show the proximity of the results obtained with the equilibrium model and with the complete model.

Example I

Total separation of two products A and B is sought, B being the more retained of the two. The interaction of the products with the solid is characterized by the following adsorption isotherms:

$$\overline{C}_1 = 0.5 \cdot C_1 + \frac{1.5 \cdot C_1}{1 + 0.03 \cdot C_1 + 0.05 \cdot C_2}$$

$$\overline{C}_2 = 0.7 \cdot C_2 + \frac{1.5 \cdot C_2}{1 + 0.03 \cdot C_1 + 0.05 \cdot C_2}$$

The feedstock is a 50/50 v/v mixture of the two products at a total concentration of 50 g/l.

In order to find the operating parameters of a simulated moving bed allowing separation of the two products, the flow rates are first calculated for a true moving bed (LMV) by means of the method according to the invention, with a model using exclusively the thermodynamic adsorption data and by imposing a 100% purity in the extract and the raffinate.

The calculated flow rates of the true moving bed LMV are:

$Q_I$=65 ml/min
$Q_{Ex}$=23.3 ml/min
$Q_F$=2.8 ml/min
$Q_{Raf}$=52 ml/min
$Q_{El}$=25.7 ml/min
$\overline{Q}$=25 ml/min.

By means of Charton and Nicoud's method mentioned above, the results obtained for the true moving bed LMV are transferred to a simulated moving bed LMS, which gives the flow rates as follows:

$Q_I$=81.8 ml/min
$Q_{Ex}$=23.3 ml/min
$Q_F$=2.8 ml/min
$Q_{Raf}$=5.2 ml/min
$Q_{El}$=25.7 ml/min
T=1.27 min.

The calculation carried out for a simulated moving bed with 10 2.6-cm diameter and 10-cm long columns, which represents 300 theoretical plates, gives with the previous flow rates purities of 99.1% in the extract and 99.3% in the raffinate. If necessary, the purities can be increased through slight correction of the flow rates. 99.6% and 99.8% are for example obtained for the extract and for the raffinate respectively with the following set of operating variables:

$Q_I$=81.8 ml/min
$Q_{Ex}$=23 ml/min
$Q_F$=2.7 ml/min
$Q_{Raf}$=5.2 ml/min
$Q_{El}$=25.7 ml/min
T=1.27 min.

Example II

In this example, a separation allowing the raffinate to be recovered at a purity of 80% and the extract at a purity close to 100% is sought by using for example an isotherm of the following type:

$$\overline{C}_1 = \frac{1.5 \cdot C_1}{1 + 0.03 \cdot C_1 + 0.05 \cdot C_2}$$

$$\overline{C}_2 = \frac{1.9 \cdot C_2}{1 + 0.03 \cdot C_1 + 0.05 \cdot C_2}$$

Calculation for a 50/50 v/v feedstock at 50 g/l by means of the method according to the invention gives, for the true moving bed, the following flow rates:

$Q_I$=76.5 ml/min
$Q_{Ex}$=10.9 ml/min
$Q_F$=1.5 ml/min
$Q_{Raf}$=6.5 ml/min
$Q_{El}$=15.9 ml/min
$\overline{Q}$=50 ml/min.

Transfer of the results to the simulated moving bed LMS as mentioned above gives the following results:

$Q_I$=110 ml/min
$Q_{Ex}$=10.9 ml/min
$Q_F$=1.5 ml/min
$Q_{Raf}$=6.5 ml/min
$Q_{El}$=15.9 ml/min
T=0.64 min.

These flow rates, applied to a real LMS consisting of 10 2.6-cm diameter and 10-cm long columns representing 300 theoretical plates, allow obtaining of a purity of 98% for the extract and 81% for the raffinate. After slight correction of the flow rates, purities of 99.6% and 81% are eventually obtained for the extract and the raffinate respectively. The final flow rates of the simulated moving bed are:

$Q_I$=110 ml/min
$Q_{Ex}$=10.3 ml/min
$Q_F$=1.5 ml/min
$Q_{Raf}$=7 ml/min
$Q_{El}$=15.8 ml/min
T=0.64 min.

It can be seen that, here again, the internal flow rates obtained by means of the equilibrium model are very close to those obtained with the complete model.

The optimum point determined by means of the method described is the optimum thermodynamic working point of the real separation system. which is in fact very close to the working point to be reached because in a countercurrent separation system, as it is well-known, equilibrium can be obtained with few plates.

The method has been described in connection with a separation loop conventionally comprising four zones. It is however clear that it can apply to a loop comprising a different number of zones.

What is claimed is:

1. A method for separating constituents of a fluid mixture in a simulated moving bed system including a loop having a series of interconnected beds containing an adsorbent solid phase, the loop including zones with an injection point for injecting a feedstock with an injection flow rate and points for drawing-off an extract and a raffinate with a drawing-off flow rate, the method including directly imposing an initial working point upon an optimum working point of the simulated moving bed system by selecting initial values which are imposed upon fluid flow rate, from the flow rate of the feedstock and concentrations of different constituents in the feedstock from corresponding flow rates of an equivalent true moving bed system comprising the steps:

(A) determining a material balance and from the material balance producing equations representing a propagation velocity of the concentrations of different constituents in a countercurrent moving bed system;

(B) determining the flow rates of the equivalent true moving bed system by:
   a) modeling an equivalent true moving bed system with a thermodynamic adsorption model,
   b) locating, along the equivalent true moving bed system, compressive and dispersive fronts in concentrations of the different constituents,
   c) determining a propagation velocity of the compressive and dispersive fronts respectively by reference to a material balance for the simulated moving bed system by solving the equations, and
   d) zeroing a propagation velocity of selected compositions at chosen points of the loop;

C) determining flow rates of the simulated moving bed system at an initial working point; and passing the feedstock through the absorbent solid phase while imposing the determined flow rates.

2. A method as claimed in claim 1 further comprising:
zeroing a velocity of the constituents for obtaining a pure component in the extract or a pure component in the raffinate.

3. A method as claimed in claim 1 further comprising:
zeroing a velocity of the constituents for obtaining an intermediate purity for the constituents in the extract or in the raffinate.

4. A method as claimed in claim 1 further comprising using favorable isotherms to determine control rates of the equivalent true moving bed system.

5. A method as claimed in claim 1 further comprising:
applying an inverse algorithm for locating the compressive and dispersive fronts with an unfavorable isotherm.

6. A method as claimed in claim 1, wherein the mixture comprises at least a first constituent and a second constituent, with the adsorbent solid phase adsorbing the second constituent more than the first constituent, the loop being divided into at least three zones comprising a first zone, a second zone and a third zone, with the liquid injection point at the inlet of first zone, one of the draw-off points for the extract being between the first zone and the second zone, an injection point for injecting feedstock being between the second and the third zone, another of the draw-off points for the raffinate being at the outlet of the third zone, with concentrations of the constituents in the feedstock and adsorption isotherms being known, further comprising determining a working point of the equivalent true moving bed system by the following steps:

D) determining a flow rate in the first zone by zeroing the propagation velocity of the second constituent;

E) determining a flow rate in the second zone and a concentration of the second constituent in the extract from an initial concentration selected by an operator of a constituent in the second zone and from a solution to the equations of the countercurrent system;

F) determining respective concentrations of the first and the second constituents in the third zone through an iterative procedure including:
   a) initializing the respective concentrations,
   b) determining a flow rate in the third zone dependent on a propagation velocity of compressive fronts, and
   c) checking the material balance for the second constituent;

G) varying respective concentrations of the first and the second constituents at an inlet of the third zone while staying on one hodograph linking respective concentrations of two constituents which satisfy a material balance for the second constituent for the simulated moving bed system;

H) determining a concentration of the first constituent in the third zone; and

I) repeating steps E to G until a material balance of the first constituent is obtained.

7. A method as claimed in claim 6 further comprising:
zeroing a velocity of the constituents for obtaining a pure component in the extract or a pure component in the raffinate.

8. A method as claimed in claim 6 further comprising:
zeroing a velocity of the constituents for obtaining an intermediate purity for the constituents in the extract or in the raffinate.

9. A method as claimed in claim 6 further comprising using favorable isotherms to determine control rates of the equivalent true moving bed system.

10. A method as claimed in claim 6 further comprising:
applying an inverse algorithm for locating the compressive and dispersive fronts with an unfavorable isotherm.

11. A method as claimed in claim 1, for separating constituents of a mixture comprising at least a first constituent and a second constituent, with the adsorbent solid phase adsorbing a second constituent more than a first constituent, the loop being divided into at least four zones comprising a first zone, a second zone, a third zone and a fourth zone, with the fluid injection point at the inlet of the first zone, one of the draw-off points for the extract being between the first and the second zone, an injection point for injecting feedstock being between the second and the third zone, and another of the draw-off points for the raffinate being between the third zone and the fourth zone, with concentrations of the constituents in the feedstock and adsorption isotherms being known, the method comprising determining a working point of the equivalent true moving bed system by the steps:

D) determining a flow rate in the first zone by zeroing a propagation velocity of the second constituent;

F) determining a flow rate in the second zone and a concentration of the second constituent in the extract from an initial concentration selected by an operator of a constituent in the second zone and from a solution to the equations of the countercurrent system;

G) determining respective concentrations of the first and second constituents in the third zone through an iterative procedure including:
   a) initializing the respective concentrations,
   b) determining a flow rate in the third zone depending on the propagation velocity of compressive fronts, and
   c) checking the material balance for the second constituent;

G) varying respective concentrations of the first and the second constituents at the inlet of the third zone while staying on one hodograph linking respective concentrations of the two constituents which satisfies a global material balance for second constituent for the simulated moving bed system;

H) determining a concentration of the first constituent in the third zone and a flow rate in the fourth zone based upon the propagation velocity of compressive fronts;

I) repeating steps E and H until the material balance of the first constituent is obtained.

* * * * *